United States Patent [19]

Magee et al.

[11] 4,334,716
[45] Jun. 15, 1982

[54] LINEAR BEARINGS

[75] Inventors: Robert C. Magee, Manhasset; Alfred M. Rogers, III, Huntington, both of N.Y.

[73] Assignee: Thomson Industries, Inc., Manhasset, N.Y.

[21] Appl. No.: 162,863

[22] Filed: Jun. 25, 1980

[51] Int. Cl.³ ............................................. F16C 29/06
[52] U.S. Cl. ..................................... 308/6 C; 308/6 B
[58] Field of Search ............... 308/6 C, DIG. 11, 6 B, 308/6 A, 6 R, 73

[56] References Cited

U.S. PATENT DOCUMENTS

| 3,545,826 | 12/1970 | Magee et al. | 308/6 C |
| 3,900,233 | 8/1975 | Thomson | 308/6 C |
| 4,128,278 | 12/1978 | Headen et al. | 308/6 C |
| 4,138,167 | 2/1979 | Ernst et al. | 308/6 C |

Primary Examiner—Lenard A. Footland
Attorney, Agent, or Firm—Morgan, Finnegan, Pine, Foley & Lee

[57] ABSTRACT

A ball bearing for linear motion which is particularly useful in applications where the "open type" ball bearing is in combination with a shaft supported along its length which is subjected to radial forces primarily toward or away from the open side of the bearing.

The ball bearing for linear motion consists of a bearing sleeve adapted to position a plurality of bearing segments on its inside surface. Each bearing segment contains a closed loop of circulating balls. The closed loop has one straight track of load bearing balls and one straight track of non-load bearing balls. The bearing segments are circumferentially positioned within the bearing sleeve so as to maximize the capacity of the bearing when load is applied either toward or away from the open side of the bearing.

11 Claims, 8 Drawing Figures

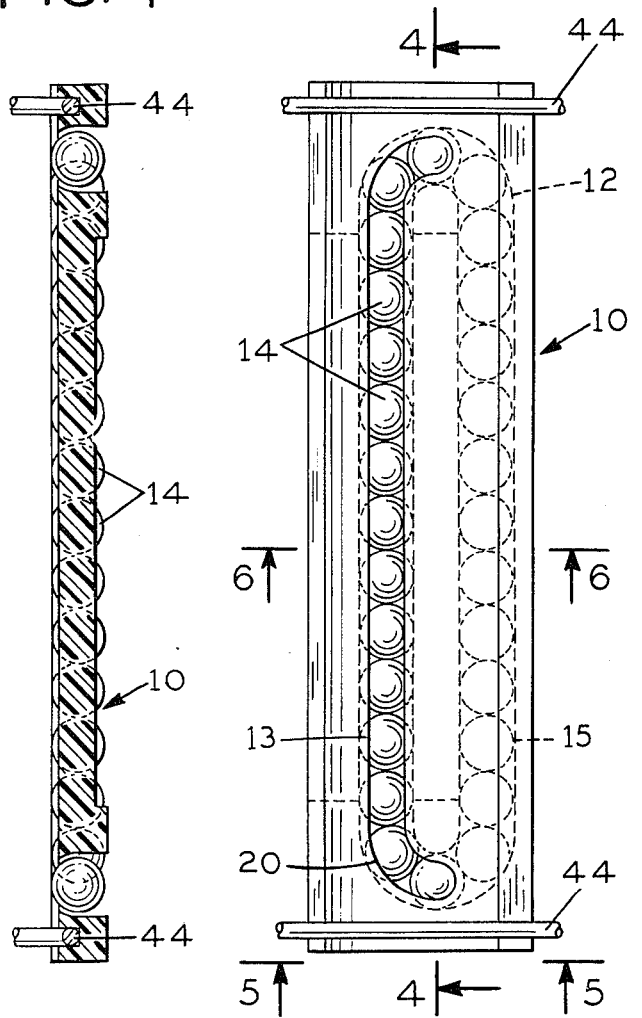

LINEAR BEARINGS

BACKGROUND OF THE INVENTION

The present invention relates generally to ball bearings and more particularly to ball bearings for linear motion.

There are in the prior art many forms of ball bearings for linear motion such as those disclosed in U.S. Pat. Nos. 3,545,826 and 3,900,233. The present invention relates to new and useful improvements over the aforesaid patents and to new and useful improvements in ball bearings for linear motion. In many instances where ball bearings for linear motion are used in combination with a shaft, the loads may be applied from any radial direction so that it is desirable for the individual ball circuits to be relatively evenly spaced within the bearing sleeve and around the shaft.

However, there are instances such as certain machine tool uses where the loads are not evenly applied and it is not necessary for the ball circuits to be evenly spaced around the shaft. In certain machine tools, for example, the primary deflection loads are in one or two specific directions with less deflection loads in other directions. In such an environment, the conventional ball bearing for linear movement may not be constructed in such a way as to adequately handle the primary loads. Particularly in the case of an "open" type bearing used in combination with a shaft supported along its length, the primary radial loads are normally applied either toward or away from the open side of the bearing. In other words, the loads are applied either towards the closed portion or the open portion of the bearing which are separated by 180°.

Another problem encountered in linear ball bearing involves the accurate alignment of the ball circuits of the retainer with the ball grooves of the races without involving excessive manufacturing costs. This problem can be acute where several circumferentially spaced circuits of balls are contained within a single large retainer element. It has proven to be difficult to accurately match the circumferential spacing of these retainer circuits with the circumferential spacing of the groove of the mating bearing plates resulting in misalignment and wear and tear on the bearing assembly.

There is a need, therefore, for a ball bearing for linear motion where the load carrying balls are spatially located so as to support more concentrated loads applied in specific directions. There is also a need for a ball bearing structure wherein misalignment between the ball guiding tracks of the retainers and the ball grooves in their associated bearing plates is substantially eliminated.

In view of the foregoing, it is an object of this invention to provide a new and improved ball bearing for linear motion.

Another object of this invention is to provide a new and improved ball bearing for linear motion having improved load bearing characteristics.

A further object of this invention is to provide a new and improved ball bearing for linear motion which is particularly adapted for use where the heaviest loads are applied in specific directions.

Still another object of this invention is to provide a new and improved ball bearing for linear motion which is particularly adapted for use in applications where heaviest loads are applied in specific directions in that the ball circuits are circumferentially positioned so as to maximize the capacity of the bearing when the loads are applied in the specific directions.

A further object of this invention is to provide a new and improved ball bearing for linear motion wherein the balls within each retainer circuit can be quickly, expeditiously and accurately assembled in alignment with respect to the ball grooves in its mating bearing plate, and will automatically maintain that proper alignment during operation.

Additional objects and advantages of the invention will be set forth in the specification which follows and, in part, will be obvious from the description, the objects and advantages being realized and obtained by means of the parts, instrumentations, methods, apparatus and procedures particularly pointed out in the appended claims.

BRIEF DESCRIPTION OF THE INVENTION

Briefly described, the invention consists of a bearing sleeve within which are positioned a plurality of individual ball bearing retainer segments which carry a closed loop or circuit of circulating balls. The closed loop or circuit includes a working track portion where the balls are in a load carrying position and a non-working track portion where the balls are non-load carrying. The retainer segments are positioned within the bearing sleeve so that there are a maximum number of working tracks and load bearing balls on opposite sides of the bearing to accommodate loads applied about 180° apart. In the case of the open type of bearing, a maximum number of load bearing ball tracks are located opposite the opening in the bearing and immediately adjacent the opening in the bearings so as to resist radial deflection in these directions. Typically, but not necessarily these loads will be in the vertical direction either upwardly or downwardly. Further, with the balls positioned in accordance with this invention, a greater number of balls than is usually the case can be positioned within the bearing. While the present invention is particularly useful with the open type bearing, it is not limited to that type bearing but could be used with a closed type bearing.

The bearing retainer segments are located within the bearing sleeve adjacent bearing plates having ball receiving grooves. The interior surface of the sleeve has a series of flats of such a width that when the retainer segments are located against these flats there is a space between adjacent bearing retainer elements which permits the retainer segment to be adjusted with respect to the groove in the bearing plate in a simple, expeditious fashion. When a shaft is inserted into the bearing, the tracks of load carrying balls are pushed outwardly into the ball grooves of the plates which shifts the retainer segments into alignment with the ball grooves and consequently with the balls also.

The invention consists of the novel parts, steps, constructions and improvements shown and described.

The accompanying drawings which are incorporated in and constitute part of this specification illustrate an embodiment of the invention and, together with the description, serve to explain the principles of the invention.

OF THE DRAWINGS

FIG. 3 is a front view taken generally along line 3—3 of FIG. 2.

FIG. 4 is a view in section along line 4—4 of FIG. 3.

FIG. 5 is an end view along 5—5 of the retainer section shown in FIG. 3.

FIG. 6 is a sectional view taken along line 6—6 of FIG. 3.

FIG. 7 is a view in section taken through one of the bearing plates shown in FIG. 2.

FIG. 8 is a view in section along line 2—2 of FIG. 1 with certain parts removed.

This invention relates to a ball bearing for linear motion and is adapted to be used with a shaft 2. The invention utilizes a bearing sleeve 4 which is preferably made of plastic within which the elements of the linear bearing are mounted. The bearing sleeve is of the open type as can be seen by the opening 6 at the bottom of the bearing sleeve 4.

As shown in FIG. 8, the bearing sleeve has a plurality of bearing plate receiving openings 8 spaced around the bearing sleeve.

Figure 1:
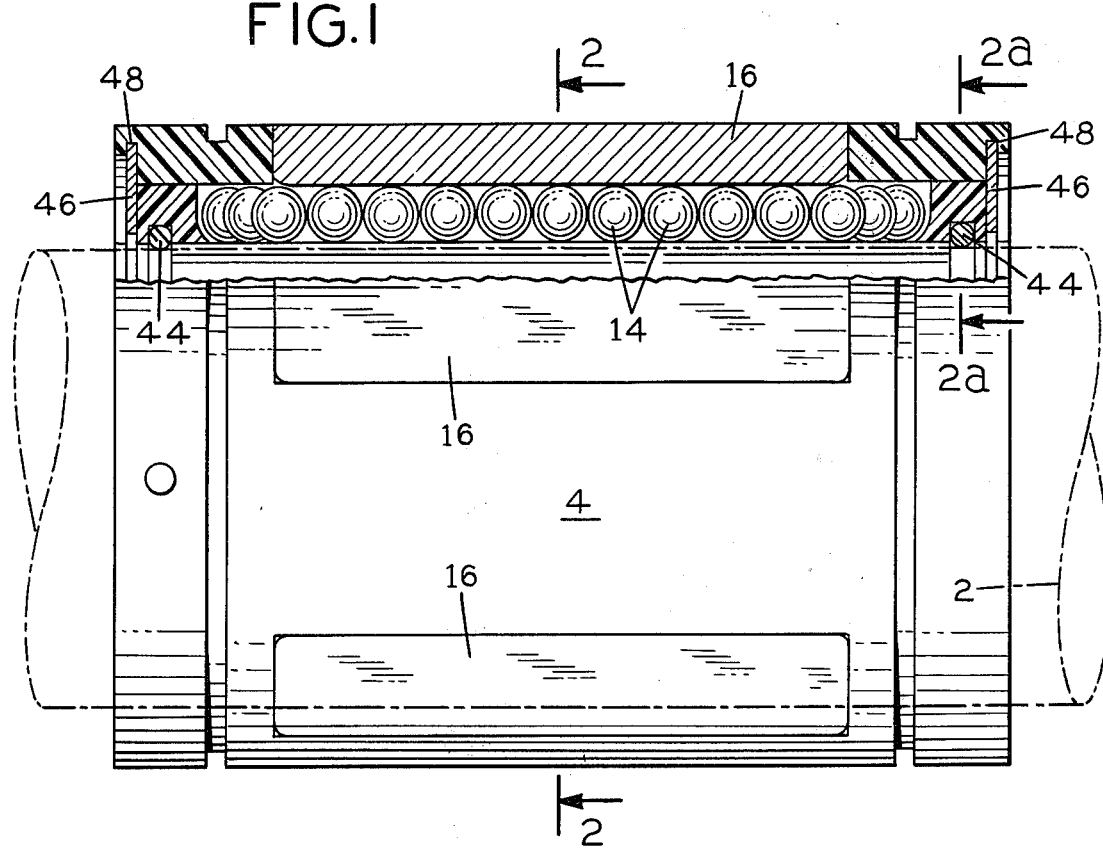
FIG. 1 is a side view of the bearing with the upper portion shown partly in section.
Figure 2:
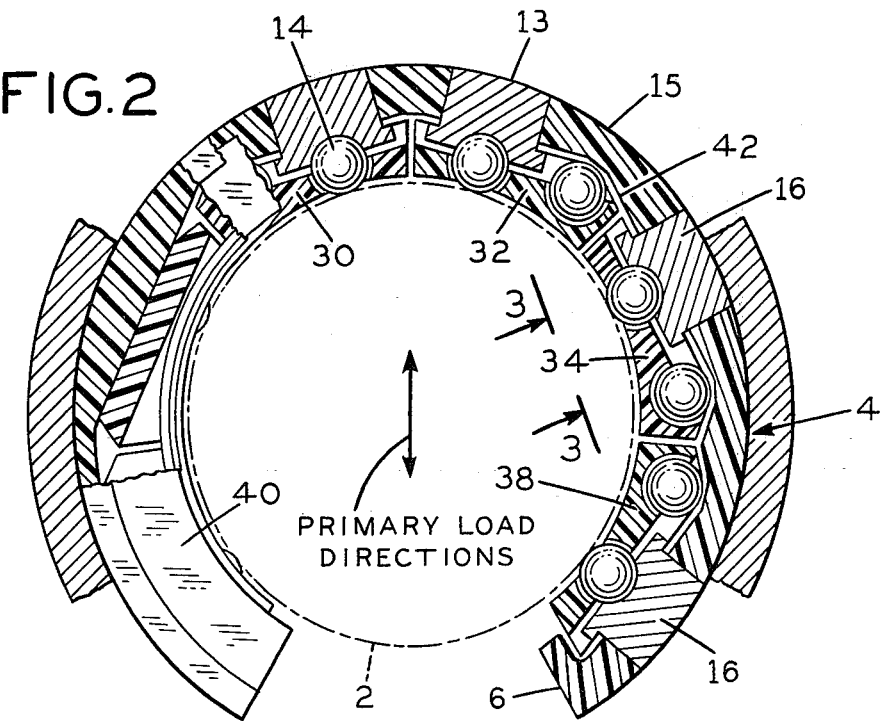
FIG. 2 is a vertical section taken along line 2—2 and 2a—2a of FIG. 1.

In accordance with this invention, individual retainer means are provided for retaining the balls in the desired circulating path. As embodied, the retainer means consists of individual retainer elements 10, preferably made of plastic, having a closed loop path 12 in which are positioned a plurality of balls 14. The closed loop path 12 has two straight track portions—a load bearing track 13 and a return or no load track 15 as can be seen in FIGS. 2, 3, 5 and 6. For this purpose, the retainer element 10 is cut away at 20 so that the balls can assume the load position as shown in FIGS. 2 and 3. In other words, each retainer element contains one row or track each of load carrying and non-load carrying balls.

Positioned within each of the bearing plate receiving openings 8 are bearing plates 16 shown in detail in FIG. 7. As shown in FIGS. 2 and 7, the outer surface 22 of the bearing plate 16 has a curvature which conforms to the curvature of the outer surface of the bearing sleeve 4 and the inner surface of the mounting housing shown in FIG. 2. The inner surface of the bearing plate 16 has a ball receiving groove 24 in which the balls are located when in the load position. The bearing plate further includes flanges 26 which prevent the bearing plate from being accidentally moved outwardly through the bearing plate opening 8 when the bearing is not installed in a surrounding housing which in use supports the bearing plates when load is applied.

In accordance with this invention, means is provided for insuring that the maximum load capacity of the bearing is in the primary load direction. Generally speaking this is in a direction towards or away from the open side of the bearing or in radial direction 180° apart. More specifically it may be the vertical direction as shown in FIG. 2. As embodied, this means comprises positioning the bearing segments so that the major number of load carrying ball tracks are located opposite the open portion of the bearing sleeve and immediately adjacent the open portion of the bearing sleeve.

As embodied, the two retainer segments 30, 32 are positioned so that their working or load bearing ball tracks are immediately adjacent the vertical center line of the bearing sleeve (See FIG. 2). The next pair of retainer segments 34, 38 are positioned immediately adjacent the non-load bearing ball tracks of bearing segments 30, 32 so that there are four load bearing ball tracks on one side of the horizontal center line of the bearing sleeve. In other words, there are four tracks of working load bearing balls in half of the ball bearing sleeve to receive loads in that vertical direction. The next pair of retainer segments 38 and 40 are reversed so that the tracks of the load bearing balls are adjacent the opening in the bearing sleeve and the non-load bearing tracks of retainer segments 38, 40 are adjacent the non-load bearing tracks of bearing segments 34, 38.

In this way, there are load bearing ball tracks immediately adjacent the opening in the bearing so that the majority of the load bearing balls are adjacent the vertical center line of the bearing to provide maximum resistance to loads in that vertical direction. Furthermore, with this arrangement it is possible to position six (6) working tracks within the open type bearing whereas with the standard open bearing only five (5) tracks can be so positioned. Moreover, there are load bearing tracks immediately adjacent the opening whereas usually with the open type bearing there is one working and one non-working track adjacent the opening.

In accordance with this invention, positioning means is provided for positioning the balls within the ball bearing receiving grooves on the bearing plates. As embodied, this means comprises a plurality of flat surfaces 42, one for each ball retaining segment on the inside surface of the bearing sleeve. As shown, there are six (6) retainer segments and six (6) flat surfaces. The flat surfaces permit the retainer segment to move a small amount across the width of the flat surface so that the balls fit within the grooves 24 in the bearing plates. Without this arrangement, misalignment can occur resulting in severe wear and tear of the balls, retainer segments or the bearing plates. Misalignment can also result in prevention of ball circulation due to binding and cause improper diameter sizing of the bearings.

The retainer segments are held in place by a retaining ring 44 which pushes the retainer segment against the flat surfaces 42 to retain the balls so that they will not fall out of the bearing, and to maintain the ball tracks in alignment with the ball bearing receiving groove 24 on the bearing plate 16. There are end washers 46 positioned in grooves 48 in the bearing sleeve which function as cover plates and prevent lengthwise movement of the retainer segments.

While the above-described positioning means is useful in the open type of bearing, its usefulness is not limited to that type of bearing and may be useful in other closed type bearings.

The invention is also useful in connection with a self-aligning crown or a compliance groove as shown and described in U.S. Pat. No. 3,545,826.

What is claimed is:

1. A linear ball bearing adapted for use where bearing is subjected to radial forces, comprising:
    (a) a bearing sleeve having an opening therein;
    (b) a plurality of bearing retainer segments having a closed circuit including a straight track portion containing load carrying balls and a second straight track portion containing non-load carrying balls;
    (c) load bearing plates operatively associated with said balls, and
    (d) means positioning said bearing retainer segments within said bearing sleeve so that the load carrying balls are positioned such that the critical ball bearing capacity is in two radial directions approximately 180° apart.

2. A linear ball bearing as defined in claim 1 wherein:

(a) a majority of said load carrying ball tracks are located within one-half of said bearing sleeve.

3. A linear ball bearing as defined in claim 2 wherein:
(a) load carrying ball tracks are positioned adjacent the opening in said bearing sleeve.

4. A linear ball bearing as defined in claim 3 wherein:
(a) at least four load carrying ball tracks positioned within one-half of said bearing sleeve; and
(b) at least two load carrying ball tracks positioned within the other half of said bearing sleeve.

5. A linear motion ball bearing adapted to resist radial deflection in predetermined directions, comprising:
(a) a bearing sleeve of the open type;
(b) a plurality of bearing retainer segments within the bearing sleeve, each bearing segment including a closed track containing circulating balls;
(c) a ball bearing plate mounted on said bearing sleeve adjacent said bearing segments and adapted to engage the balls under load; and
(d) means positioning said bearing retainer segments within said sleeve so that the bearings under load are positioned to resist critical radial forces in predetermined opposite directions.

6. A linear motion ball bearing as defined in claim 5 wherein:
(a) said bearing retainer segments are arranged so that there are at least two paths of working tracks positioned immediately on each side of the centerline of the bearing sleeve and at least one path of working tracks positioned adjacent each side of the opening in said bearing sleeve.

7. A ball bearing for linear motion for reducing radial deflection primarily in two predetermined radial directions, spaced 180° apart, comprising:
(a) a bearing sleeve of the open type;
(b) a plurality of bearing retainer segments, each bearing retainer segment having a closed loop track containing circulating balls, each loop having straight working tracks where the balls are under load and non-working tracks where the balls are not under load;
(c) a plurality of bearing plates corresponding in number to the number of working tracks mounted in openings in the bearing sleeve, a ball receiving groove in each bearing plate adapted to be engaged by the balls;
(d) a plurality of flat surfaces on the inside surface of said bearing sleeve corresponding in number to the number of bearing retainer segments, said flat surfaces permitting said bearing segments to be moved so as to align said balls with said grooves; and
(e) said bearing segments being arranged within said bearing sleeve so that said working balls are positioned so as to prevent radial deflection in radial directions spaced 180° apart.

8. A ball bearing for linear motion as defined in claim 7 wherein:
(a) at least one track of working balls is located immediately adjacent and on opposite sides of the centerline of said bearing sleeve and at least one track of working balls is located adjacent each side of the opening in said bearing sleeve.

9. A ball bearing for linear motion as defined in claim 8 wherein said tracks of ball bearings are arranged so beginning immediately adjacent the centerline of the bearing sleeve there is a working track of balls, a non-working track of ball bearings, a working track of balls, a non-working track of balls, a non-working track of balls and a working track of balls.

10. A ball bearing for linear motion as defined in claim 9 wherein the centerline is a vertical centerline.

11. A ball bearing for linear motion, comprising:
(a) a bearing sleeve;
(b) a plurality of bearing segments, each bearing segment having a closed loop containing recirculating balls, each loop having working tracks where the balls are under load and a non-working track where the balls are not under load;
(c) a plurality of bearing plates corresponding in number to the number of working tracks mounted in openings in the bearing sleeve, a ball receiving groove in each bearing plate adapted to be engaged by the balls;
(d) a plurality of flat surfaces on the inside surface of said bearing sleeve corresponding in number to the number of bearing segments, said flat surfaces permitting said bearing segments to be moved so as to align said balls with said grooves; and
(e) means for maintaining said bearing segments in engagement with said flat surfaces.

* * * * *